United States Patent [19]

Morita et al.

[11] Patent Number: 5,231,891
[45] Date of Patent: Aug. 3, 1993

[54] DOUBLE PEDAL MECHANISM FOR WORKING VEHICLE

[75] Inventors: Shigeru Morita; Terutaka Takei; Yoshikazu Togoshi; Yoshihiro Kawahara; Nobuhide Yanagawa, all of Osaka, Japan

[73] Assignee: Kubota Corp., Osaka, Japan

[21] Appl. No.: 893,957

[22] Filed: Jun. 4, 1992

Related U.S. Application Data

[63] Continuation of Ser. No. 513,303, Apr. 20, 1990, abandoned.

[30] Foreign Application Priority Data

May 16, 1989 [JP] Japan .................. 1-123096
Sep. 4, 1989 [JP] Japan .................. 1-229066

[51] Int. Cl.⁵ .............................................. G05G 1/14
[52] U.S. Cl. .............................. 74/512; 74/560; 74/562; 74/562.5; 74/474
[58] Field of Search .............. 74/474, 513, 481, 512, 74/560, 564, 6

[56] References Cited

U.S. PATENT DOCUMENTS

| | | | |
|---|---|---|---|
| 3,919,896 | 11/1975 | Foster | 74/474 |
| 4,470,321 | 9/1984 | Girty | 74/474 |
| 4,608,879 | 9/1986 | Ishida et al. | 74/474 |
| 4,633,727 | 1/1987 | Pike | 74/512 X |
| 4,736,648 | 4/1988 | Perego | 74/474 |
| 4,763,538 | 8/1988 | Fujita et al. | 74/6 |
| 5,048,638 | 9/1991 | Duncan et al. | 74/561 |

FOREIGN PATENT DOCUMENTS

| | | | |
|---|---|---|---|
| 1530836 | 2/1970 | Fed. Rep. of Germany | 74/474 |
| 60-146729 | 8/1985 | Japan . | |
| 2193273 | 2/1988 | United Kingdom | 425/298 |

OTHER PUBLICATIONS

Cycle Magazine, Jan. 1988, pp. 34 and 35.

*Primary Examiner*—Vinh T. Luong
*Attorney, Agent, or Firm*—Jordan and Hamburg

[57] ABSTRACT

A change speed pedal mechanism for controlling a transmission of a working vehicle comprises a first pedal pivotable on an axis extending transversely of a vehicle body, and a second pedal disposed adjacent the first pedal and pivotable on an axis extending longitudinally of the vehicle body. The first pedal is connected to the transmission such that its depression shifts the transmission in a forward accelerating direction. The second pedal includes a linkage arm extending to a position under the first pedal. When the second pedal is depressed, the linkage arm lifts the first pedal, thereby shifting the transmission in a backward accelerating direction.

4 Claims, 5 Drawing Sheets

DOUBLE PEDAL MECHANISM FOR WORKING VEHICLE

This application is a continuation of application Ser. No. 07/513,303, filed Apr. 20, 1990 now abandoned.

BACKGROUND OF THE INVENTION

The present invention relates to a speed control structure for a working vehicle, particularly a front mower type garden tractor, having a stepless change speed apparatus which provides backward drive as well as forward drive across a neutral position.

There are working vehicles such as front mower type garden tractors that have a hydrostatic transmission which is one example of change speed apparatus as noted above. An example of change speed structure for operating the hydrostatic transmission is disclosed in Japanese Patent Publication Kokai No. 60-146729. This construction comprises a change speed pedal including a first pad for forward drive and a second pad for backward drive at longitudinally opposite ends thereof. The change speed pedal is mechanically connected to the hydrostatic transmission through rods and the like.

With the disclosed construction, a backward and forward changeover as well as acceleration and deceleration are effected by a down-toe motion applied to the first pad for forward drive and a down-heel motion applied to the second pad for backward drive after moving the foot rearwardly. It is difficult to repeat the backward and forward changeover frequently and promptly because the foot must be moved over an extensive range. Furthermore, it is difficult to effect delicate speed controls for the backward drive by depressing the second pad with the heel.

To overcome such disadvantages, a different construction has been used in which a forward change speed pedal and a backward change speed pedal are arranged side by side for depression by the toe end of a foot. In this instance, the two pedals are operatively connected to the hydrostatic transmission, respectively, which requires two separate interlocking lines for forward drive and backward drive, resulting in a complicated construction.

SUMMARY OF THE INVENTION

An object of the present invention is to provide an improvement in the change speed pedal mechanism for a working vehicle including a change speed device having a forward change speed region and a backward change speed region across a neutral position, the improved mechanism having a simple construction and including a forward drive pedal and a backward drive pedal both operable with the toe-end of a foot.

In order to achieve the above object, a pedal mechanism is provided, according to the present invention, which comprises a first pedal pivotable on a first axis extending transversely of a longitudinal axis of a vehicle body, an interlocking device for transmitting displacement of the first pedal to the change speed device, the interlocking device being operable to move the change speed device in a forward accelerating direction with a depression, namely a downward pivotal movement, of the first pedal, and in a backward accelerating direction with an upward pivotal movement of the first pedal, and a second pedal disposed adjacent the first pedal and pivotable on a second axis extending substantially parallel to the longitudinal axis of the vehicle body, the second pedal including a linkage arm for contacting the first pedal and transmitting a depression, namely a downward pivotal movement, of the second pedal to the first pedal as an upward pivotal movement of the first pedal.

With the above construction, when the foot pad of the first pedal is depressed with the toe-end of the driver's foot, the interlocking device causes the change speed device of the transmission to shift from a neutral position in a forward accelerating direction. Since the second pedal is disposed adjacent the first pedal, the toe-end of the foot may just be swung to the second pedal to depress the foot pad of the second pedal.

When the second pedal is depressed, the arm causes the first pedal to pivot upwardly. As a result, the change speed device of the transmission is shifted from the neutral position in a backward accelerating direction.

Thus, both change speed operation for forward drive and backward drive may be effected with the toe-end of a foot. This promotes the speed control of a working vehicle.

According to the present invention, the first pedal for forward drive and the second pedal for backward drive are both operable with the toe-end of a foot, and the transmission is shiftable in both the forward direction and backward direction by means of the interlocking device of the first pedal. This construction, therefore, is simple compared with the conventional construction having two separate interlocking lines for the forward drive and backward drive.

In a preferred embodiment of the invention, the second pedal is disposed outwardly of the first pedal with respect to the longitudinal axis of the vehicle body. The first pedal includes a first arm extending from the first axis, and a forward drive pedal pad attached to a free end of the first arm for supporting the toe-end of a driver's foot. The second pedal includes a second arm extending from the second axis, and a backward drive pedal pad attached to a free end of the second arm for supporting the toe-end of the driver's foot. The linkage arm extends from a position opposed to the second arm and having a free end thereof contacting a lower face of the first arm. The forward drive pedal pad and the backward drive pedal pad are disposed in a range approachable by the toe-end of the driver's foot swung on the heel thereof.

According to this construction, when the toe-end of the foot which has been placed on the first pedal for forward drive is to be used to depress the second pedal for backward drive, the toe-end need only be swung sideways in an obliquely downward direction in a substantially continuous movement. This enables a quick switching operation to be effected from forward drive to backward drive compared with the type of pedal mechanism in which backward change speed is effected by first swinging the toe end sideways and then causing a forward depression.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

First Embodiment The present invention will be described further with reference to the drawings showing a riding garden tractor which is one example of working vehicles.

Figure 1:
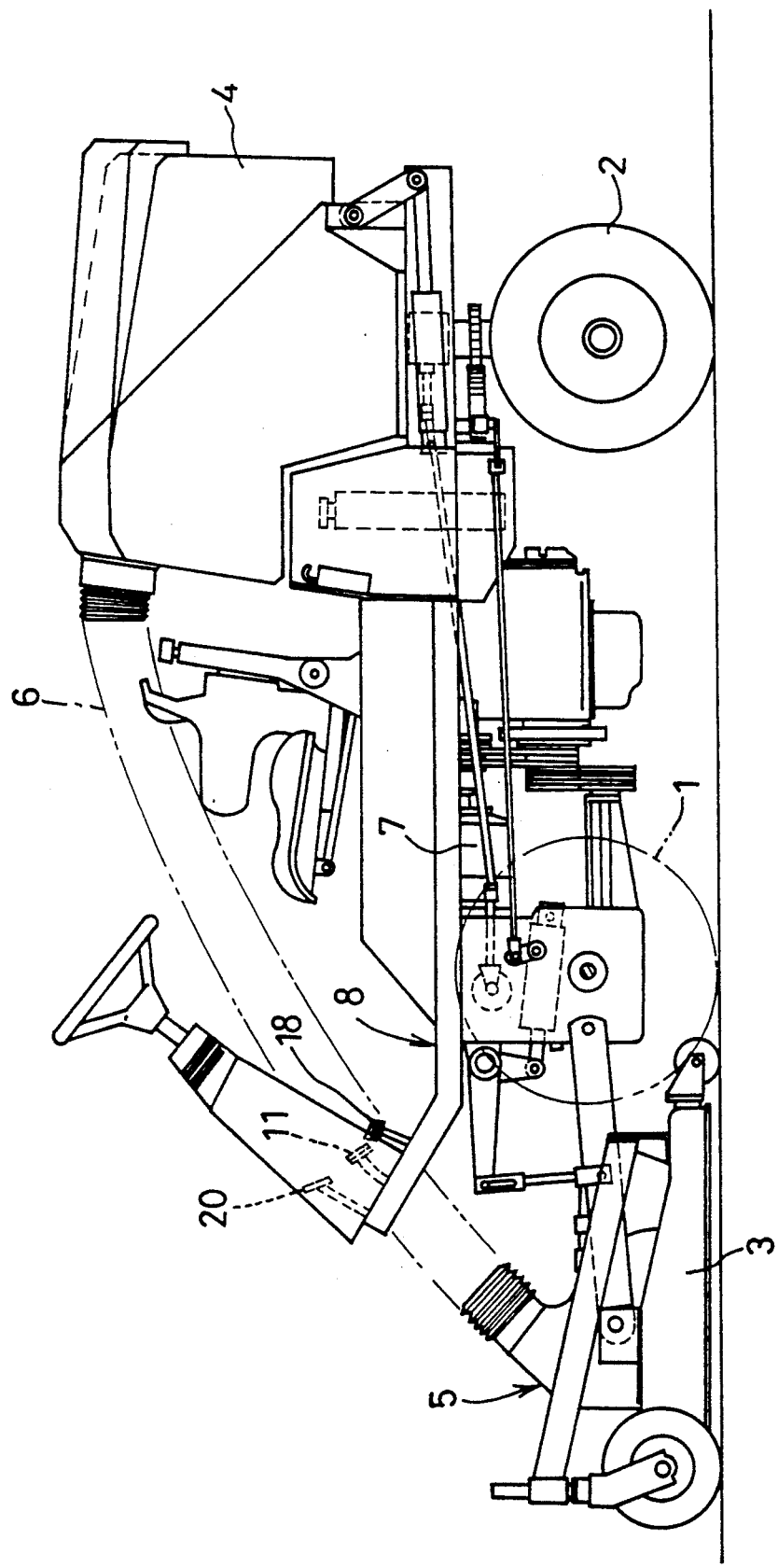
FIG. 1 is a side elevation of a front mower employing a double pedal mechanism according to the present invention.

As shown in FIG. 1, a front mower type garden tractor comprises front drive wheels 1, rear steering and drive wheels 2, a lawn mower 3 connected to a front end of a tractor frame, and a grass catcher 4 mounted on a rear end of the tractor frame. Grass cut by the mower 3 is transmitted from a blower 5 through a duct 6 to the grass catcher 4.

Figure 2:
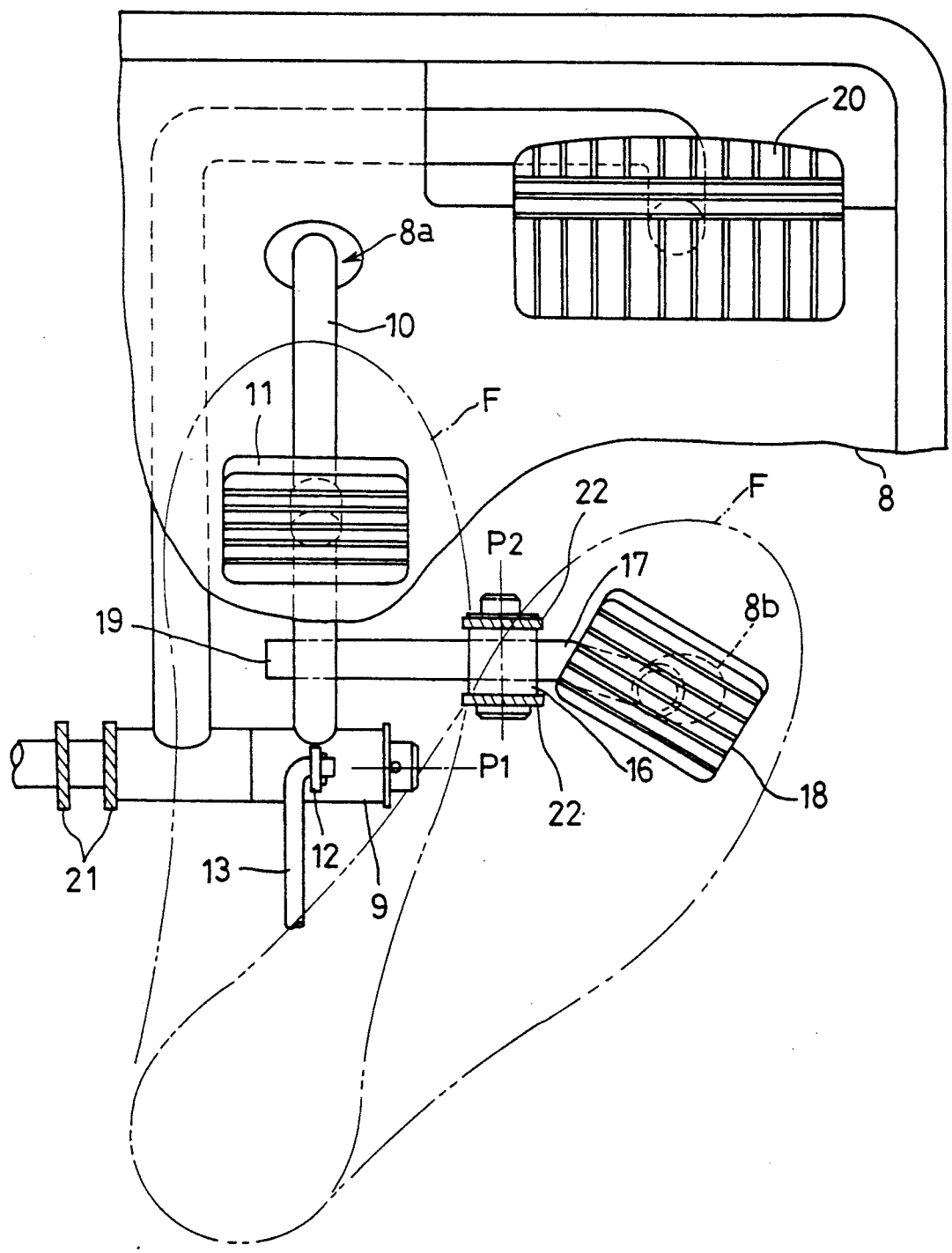
FIG. 2 is a plan view of the double pedal mechanism.
Figure 3:
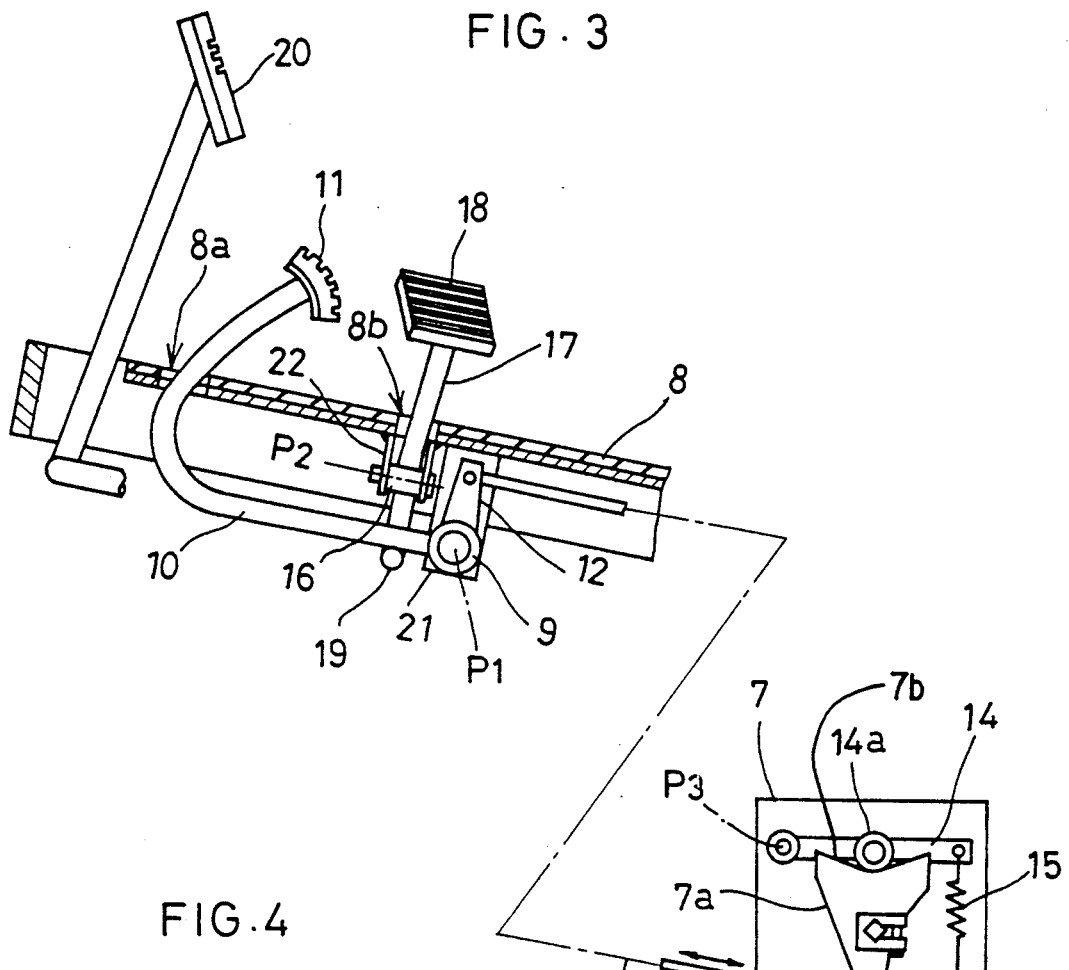
FIG. 3 is a schematic side view of an interlocking structure between the double pedal mechanism and a hydrostatic transmission with the latter in neutral position.
Figure 4:
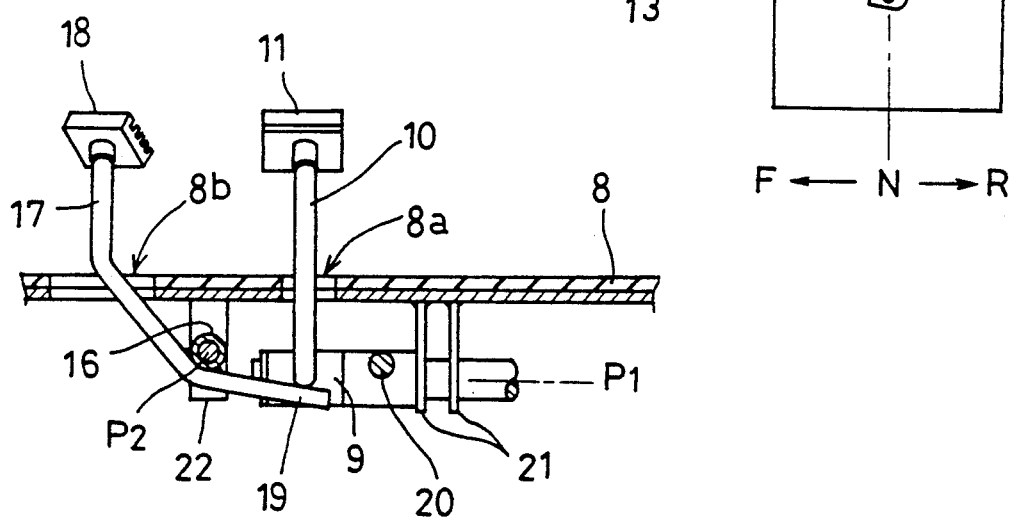
FIG. 4 is a front view of the double pedal mechanism

This garden tractor has a hydrostatic transmission 7 acting as a stepless change speed device. The transmission 7 is operable by a control structure as described hereinafter. As shown in FIGS. 2 through 4, a floor panel 8 supports, through a bracket 21, a first boss 9 rotatable on a transverse axis P1 under the floor panel 8. A first arm 10 is fixed to the first boss 9, and extends forwardly and upwardly of the tractor frame. The first arm 10 projects upwardly through a first bore 8a defined in the floor panel 8, and carries a first pedal 11 on its upper end.

Figure 3A:
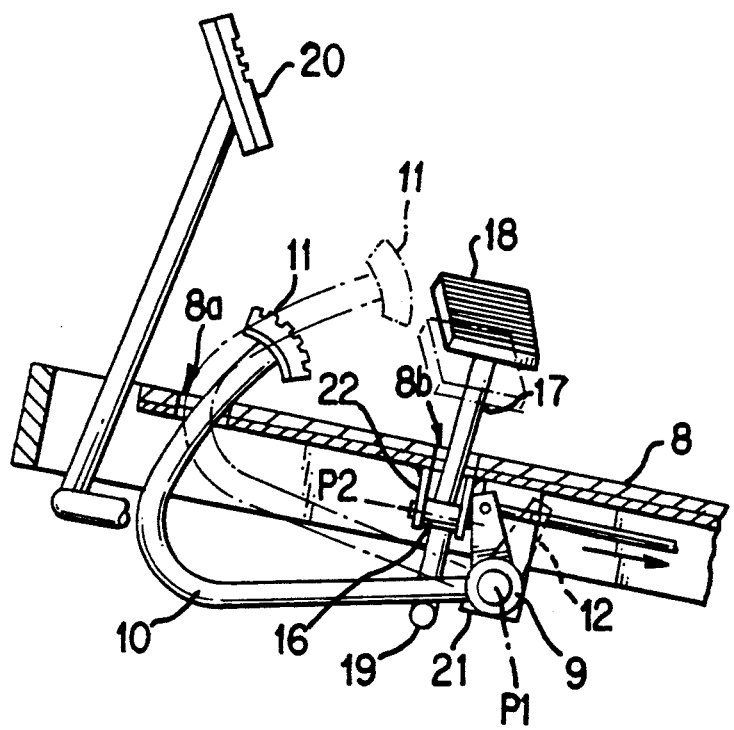
FIGS. 3A and 3B are views like FIG. 3 but showing the pedals in moved positions.

A control arm 12 is fixed to the first boss 9, which arm 12 is operatively connected through an interlocking link 13 to a change speed element 7a of the hydrostatic transmission 7. When the driver forwardly depresses the first pedal 11 with the toe-end of his or her foot F, with the heel resting on the floor panel 8, the change speed element 7a of the transmission 7 is operated from a neutral position N to a forward drive position F with acceleration (FIG. 3A). A brake pedal 20 is supported to be pivotable on the axis P1.

As shown in FIG. 3, a mechanism is provided for urging the change speed element 7a to the neutral position N. This mechanism includes an arm 14 vertically oscillatable on a transverse axis P3. The arm 14 carries a roller 14a at an approximately middle position thereof for engagement with a V-shaped upper surface of the change speed element 7a. The arm 14 is urged downward by a spring 15 connected to a free end thereof.

As shown in FIGS. 2 through 4, the floor panel 8 further supports, through a bracket 22, a second boss 16 disposed rightwardly of the first boss 9 to be rotatable on a fore and aft axis P2 under the floor panel 8. A second arm 17 is fixed to the second boss 16, and extends rightwardly and upwardly of the tractor frame. The second arm 17 projects upwardly through a second bore 8b defined in the floor panel 8, and carries a second pedal 18 on its upper end. The second pedal 18 is attached to the second arm 17 as obliquely inclined in a rightward and forward direction. As seen from FIG. 1, the second pedal 18 is disposed, in plan view, laterally outwardly of a position between the first boss 9 and first pedal 11. Further, an engaging arm 19 extends in a direction opposite to the second arm 17 to a position under the first arm 10.

Figure 3B:
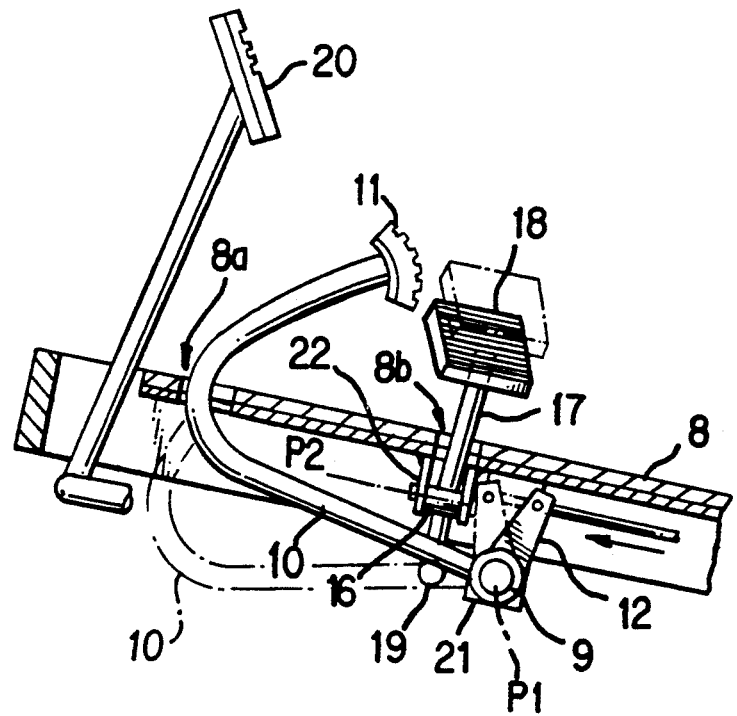

As shown in FIG. 2, the driver may swing the toe-end of his or her foot F rightwardly and downwardly from the first pedal 11, with the heel resting on the floor panel 8. Then the driver is able to depress the second pedal 18 with the toe-end. When the second pedal 18 is depressed, the first arm 10 is lifted by the engaging arm 19. As a result, the change speed element 7a of the hydrostatic transmission 7 is operated, through the interlocking link 13, from the neutral position N to a backward drive position R with acceleration (FIG. 3B).

The first arm 10 may define a slot extending in the fore and aft direction, with the engaging arm 19 extending through the slot instead of extending to a position under the first arm 10. Further, the second arm 17 and engaging arm 19 may comprise separate elements fixed to the second boss 16 instead of being a single bar member as illustrated.

The second pedal 18 may be disposed on a rightward extension of the axis P1 in FIG. 2, depending on the inclination angle of the floor panel 8 and the position of the first pedal 11.

Second Embodiment

Figure 5:
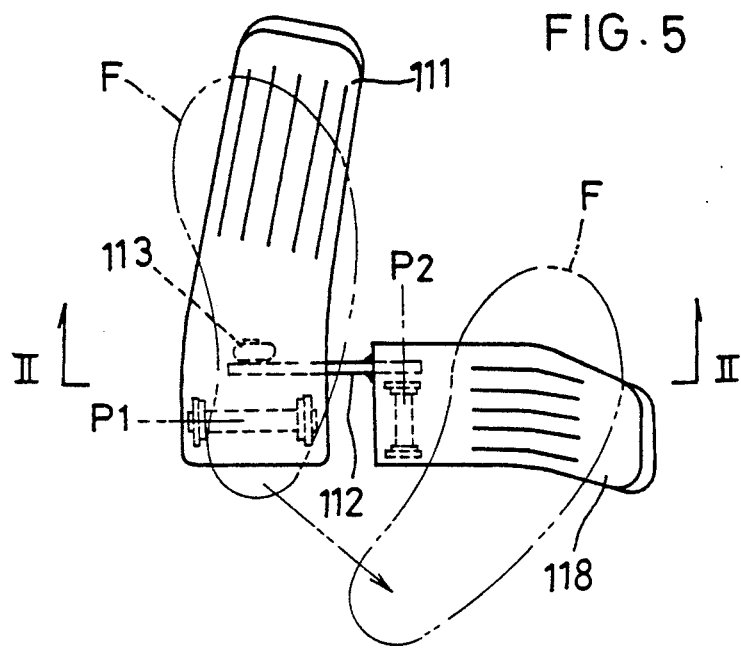
FIG. 5 is a plan view of a double pedal mechanism in a different embodiment of the invention.
Figure 6:
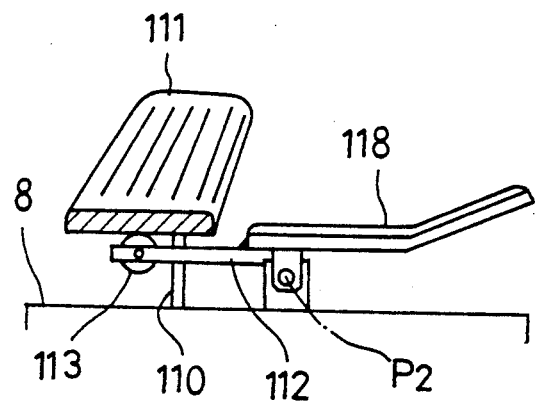
FIG. 6 is a section taken on line VI—VI of FIG. 5.
Figure 7:
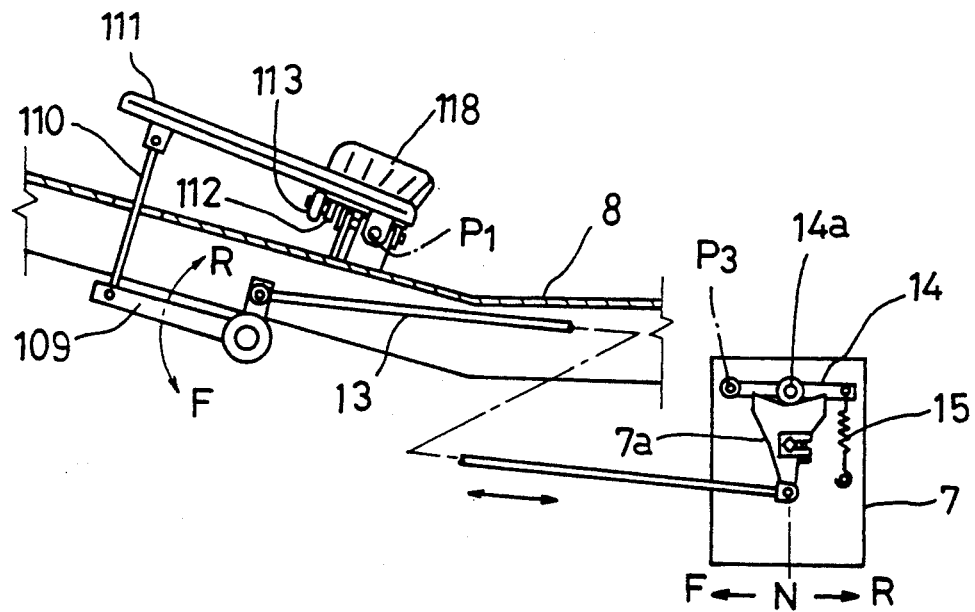
FIG. 7 is a schematic side view of an interlocking structure between the double pedal mechanism shown in FIG. 5 and a hydrostatic transmission.

As shown in FIGS. 5 through 7, this embodiment also has a first pedal 111 pivotable on a transverse axis P1 on a floor panel 8. A first arm 10 is fixed to the first boss 9, and extends forwardly and upwardly of the tractor frame. The first pedal 111 is operatively connected through rods 110 and 113 and a bell crank 109 to the change speed element 7a of the hydrostatic transmission 7. When the driver forwardly depresses the first pedal 111 with his or her foot F, the change speed element 7a of the transmission 7 is operated from a neutral position N to a forward drive position F with acceleration.

As shown in FIG. 7, a mechanism is provided for urging the change speed element 7a to the neutral position N. This mechanism includes an arm 14 vertically oscillatable on a transverse axis P3. The arm 14 carries a roller 14a at an approximately middle position thereof for engagement with a V-shaped upper surface 7b of the change speed element 7a. The arm 14 is urged downward by a spring 15 connected to a free end thereof.

A second pedal 118 is disposed rightwardly of the first pedal 111 to be rotatable on a fore and aft axis P2. An arm 112 is fixed to the undersurface of the second pedal 118, and extends to a position under the first pedal 111, with a roller 114 attached to an extreme end of the arm 112.

As shown in FIG. 5, the driver may swing his or her foot F rightwardly from the first pedal 111, to place the toe-end of the foot F on the second pedal 118. Then the driver is able to depress the second pedal 118 with the toe-end. When the second pedal 118 is depressed, the first pedal 111 is lifted by the arm 112. As a result, this movement of the first pedal 111 is transmitted to the change speed element 7a of the hydrostatic transmission 7 through the rods 110 and 113 and bell crank 109. This shifts the change speed element 7a from the neutral position N to a backward drive position R with acceleration.

What is claimed is:

1. A combination comprising a working vehicle having at least one pair of mutually coaxial ground engaging wheels and a floor panel, and a change speed operating apparatus, said change speed operating apparatus comprising
   (a) a change speed device having a forward change speed region on one side of a neutral position and a reverse change speed region on a side of said neutral position opposite said one side thereof and
   (b) a change speed pedal mechanism, said change speed pedal mechanism comprising
   a first pedal means mounted under said floor panel and being pivoted on a first axis extending transversely of a longitudinal axis of the working vehicle, said first pedal means having
   a first arm extending upward from said first axis via a first hole in said floor panel,
   a first pedal plate attached to a free end of said first arm above said floor panel, for contacting an operator's toes, and
   interlock means interconnecting said first pedal means and said change speed device for transmitting displacement of said first pedal means to said change speed device, said interlock means being under said floor panel and being connected to said change speed device to move said change speed device into said forward change speed region with a downward pivotal displacement of said first pedal means, and to move said change speed device into said reverse change speed region in response to upward pivotal movement of said first pedal means,
   a second pedal means under said floor panel and pivoted on a second axis adjacent said first pedal means and extending substantially parallel to the longitudinal axis of said working vehicle, said second pedal means including
   a second arm extending upward from said second axis through a second hole in said floor panel,
   a second pedal plate attached to a free end of said second arm, and
   a linkage arm positioned to contact said first arm for converting downward pivotal displacement of said second arm to upward pivotal displacement of said first arm, said linkage arm being mounted underneath said floor panel, extending from a side of said second axis opposite said second arm, and having a free end positioned to contact a lower face of said first arm, and
   means for urging said change speed device into said neutral position when neither said first pedal means nor said second pedal means is depressed.

2. A change speed pedal mechanism as claimed in claim 1, wherein said second pedal means is disposed outwardly of said first pedal means with respect to the longitudinal axis of said vehicle.

3. A change speed pedal mechanism as claimed in claim 1, wherein said change speed device is a hydrostatic transmission.

4. In a working vehicle having at least one pair of mutually coaxially ground engaging wheels, a floor panel and a change speed operating apparatus, said change speed operating apparatus comprising
   (a) a change speed device having a forward change speed region and a reverse change speed region and a neutral position between said forward and reverse change speed regions, and
   (b) a change speed pedal mechanism, said change speed pedal mechanism comprising
   a first pedal means under said floor panel and pivoted on a first axis extending transversely of a longitudinal axis of said working vehicle,
   a first arm extending through a hole in said floor panel and having a first pedal plate affixed thereto above said floor panel, and
   interlock means interconnecting said first pedal means and said change speed device for transmitting displacement of said first pedal means to said change speed device, said interlock means being connected to said change speed device to move said change speed device into said forward change speed region in response to downward pivotal movement of said first pedal means, and into said reverse change speed region in response to upward pivotal movement of said first pedal means, said interlock means comprising an element having a V-shaped surface and a spring loaded pivotally mounted arm carrying a roller which is received in the V of the V-shaped upper surface when neither the first pedal means nor a second pedal means is depressed, the change speed device being in the neutral position when the roller is received in the V, and
   a second pedal means adjacent said first pedal means and pivotable on a second axis extending substantially parallel to the longitudinal axis of said working vehicle, said second pedal means having a second arm extending upward through a hole in said floor panel with a second pedal on said second arm above said floor panel, said second pedal means further including a linkage arm positioned to contact said first pedal means and transmit downward pivotal movement of said second pedal means to said first pedal means as an upward pivotal movement of said first pedal means.

* * * * *

UNITED STATES PATENT AND TRADEMARK OFFICE
CERTIFICATE OF CORRECTION

PATENT NO. : 5,231,891
DATED : August 3, 1993
INVENTOR(S) : Shigeru MORITA et al It is certified that error appears in the above-identified patent and that said Letters Patent is hereby corrected as shown below:

On the title page, Item [75]:

Delete the name of the second inventor "Terutaka Takei".

Signed and Sealed this

Twelfth Day of October, 1993

Attest:

BRUCE LEHMAN

Attesting Officer          Commissioner of Patents and Trademarks